(12) United States Patent
Muurinen et al.

(10) Patent No.: US 9,559,547 B2
(45) Date of Patent: Jan. 31, 2017

(54) USER INDICATION OF COMPATIBLE WIRELESS CHARGING AREA

(71) Applicant: Nokia Corporation, Espoo (FI)

(72) Inventors: Jari Juhani Muurinen, Perniö (FI); Petri Vuori, Salo (FI)

(73) Assignee: Nokia Technologies Oy, Espoo (FI)

( * ) Notice: Subject to any disclaimer, the term of this patent is extended or adjusted under 35 U.S.C. 154(b) by 413 days.

(21) Appl. No.: 14/301,244

(22) Filed: Jun. 10, 2014

(65) Prior Publication Data
US 2015/0357861 A1 Dec. 10, 2015

(51) Int. Cl.
*H02J 7/02* (2016.01)
*H02J 17/00* (2006.01)
*H02J 7/00* (2006.01)

(52) U.S. Cl.
CPC ............... *H02J 7/025* (2013.01); *H02J 17/00* (2013.01); *H02J 50/10* (2016.02); *H02J 50/80* (2016.02); *H02J 7/0042* (2013.01)

(58) Field of Classification Search
CPC ........................................................ H02J 5/005
USPC ........................................................ 307/104
See application file for complete search history.

*Primary Examiner* — Robert Deberadinis
(74) *Attorney, Agent, or Firm* — Mintz Levin Cohn Ferris Glovsky and Popeo, P.C.

(57) ABSTRACT

In some example embodiments, there may be provided a method, which may include detecting a presence of an object at least proximate to a first wireless power transmitter; determining whether the object is compatible with a first wireless power protocol of the first wireless power transmitter; and providing an indication representative of a location of a second wireless power transmitter, when the determining indicates the object is incompatible with the first wireless power protocol of the first wireless power transmitter. Related systems, methods, and articles of manufacture are also disclosed.

15 Claims, 6 Drawing Sheets

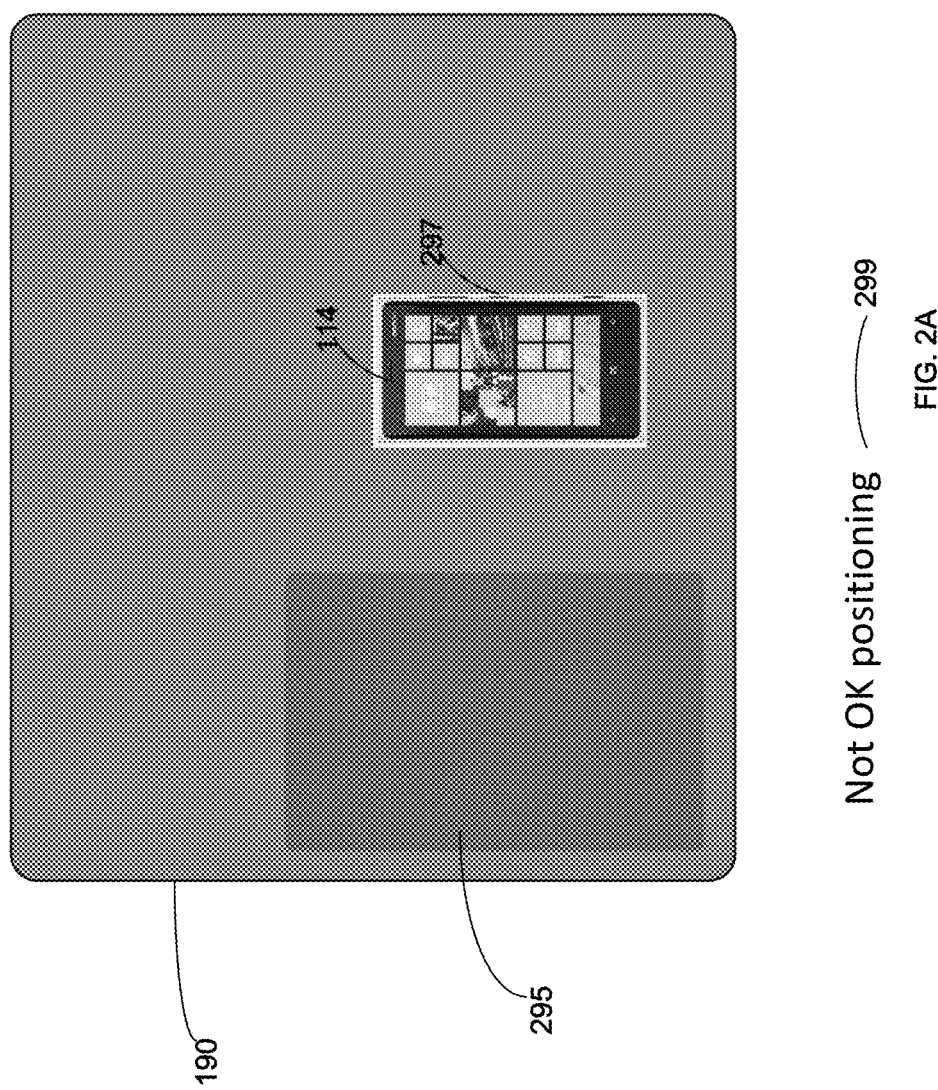
FIG. 2A — Not OK positioning

USER INDICATION OF COMPATIBLE WIRELESS CHARGING AREA

FIELD

The subject matter described herein relates to wireless charging.

BACKGROUND

Wireless charging refers to a power transmitter transferring energy wirelessly to a power receiver. For example, a power transmitter may be implemented as a so-called charging plate. In this example, when another device is placed on the charging plate, the power transmitter transfers energy to the other device (i.e., the power receiver). In this way, the other device can be charged. Wireless charging may work based on the principle of inductive charging, although other technologies may be used as well including magnetic resonance based charging. The power transmitter may include a primary coil which when energized induces an electromagnetic field into the adjacent secondary coil in the power receiver.

SUMMARY

Methods and apparatus, including computer program products, are provided for wireless charging.

In some example embodiments, there may be provided a method, which may include detecting a presence of an object at least proximate to a first wireless power transmitter; determining whether the object is compatible with a first wireless power protocol of the first wireless power transmitter; and providing an indication representative of a location of a second wireless power transmitter, when the determining indicates the object is incompatible with the first wireless power protocol of the first wireless power transmitter.

In some variations, one or more of the features disclosed herein including the following features can optionally be included in any feasible combination. The determining whether the object is compatible with the first wireless power protocol may also include sending a ping signal according to the first wireless power protocol; and determining whether a response is received in a predetermined time. The response may be a ping response. The method may also include sending a ping signal according to a second wireless power protocol of the second wireless power transmitter and determining whether a second ping response is received in a predetermined time. The determining whether the object is compatible with the first wireless power protocol may include detecting a load modulation of the ping signal, decoding the load modulation of the ping signal to obtain a ping response, and determining that the ping response is not compatible with the first wireless power protocol. The method may further include determining that the ping response is compatible with a second wireless power protocol of the second wireless power transmitter. The first wireless power transmitter may support a plurality of wireless power protocols or protocol versions. The method may further include providing the indication representative of the location of the second wireless power transmitter, in response to determining that the object is compatible with the first wireless power transmitter and the second wireless power transmitter.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF THE DRAWINGS

In the drawings,

FIG. 2A depicts an example of an indication generated to show that a wireless charging receiver is not compatible with a wireless charging transmitter, in accordance with some example embodiments;

Figure 1:
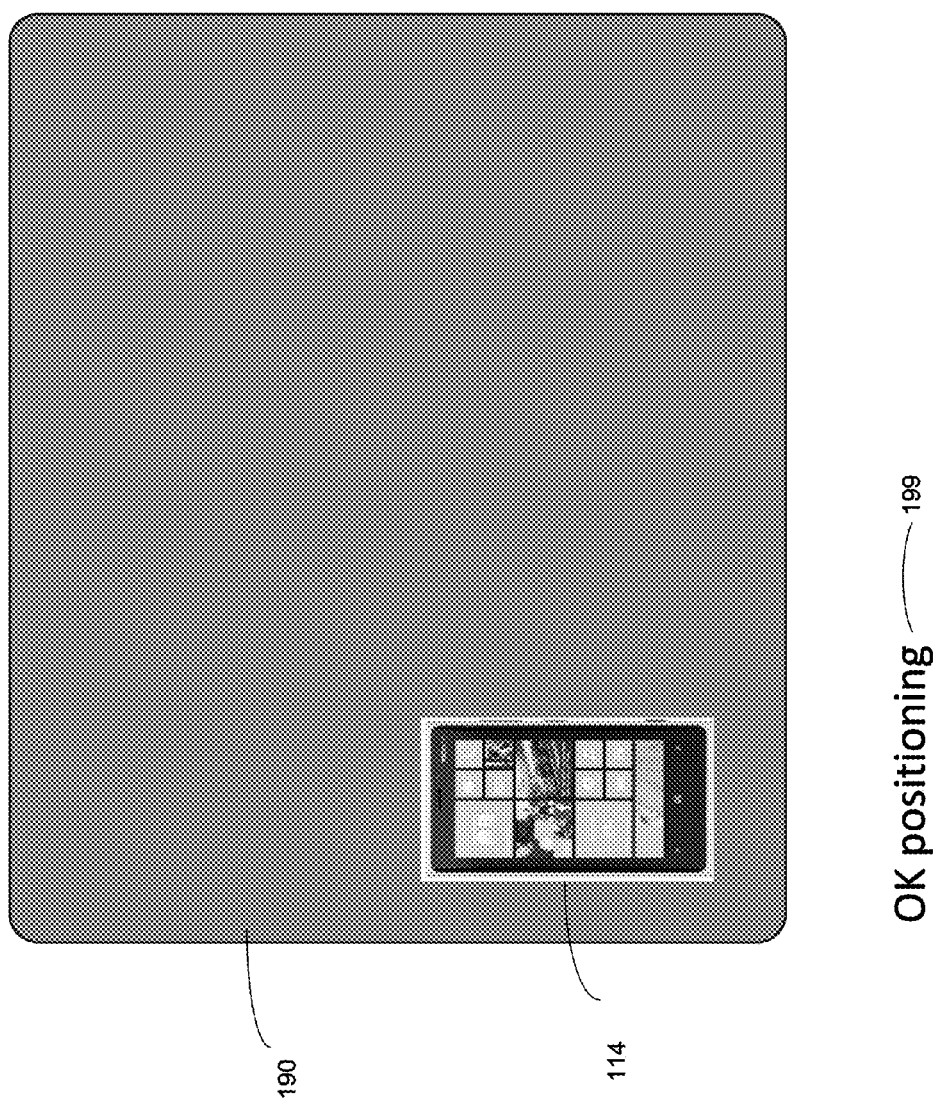
FIG. 1 depicts an example of an indication generated to show that a wireless charging receiver is compatible with a wireless charging transmitter, in accordance with some example embodiments.

Like labels are used to refer to same or similar items in the drawings.

DETAILED DESCRIPTION

Wireless power transmission may be used to wirelessly transfer power from a power transmitter to a power receiver, without a wired connection between the transmitter and receiver. Specifically, the power transmitter may use inductive coupling to transfer power from a primary coil at the power transmitter to an adjacent secondary coil at the power receiver. In this way, the power transmitter can for example transfer power to charge the power receiver's battery.

To provide interoperability between devices, there is a variety of standards specifying wireless charging. One of those standards is the Wireless Power Consortium Qi wireless charging standard, System Description, Wireless Power Transfer, Volume I: Low Power, Part 1: Interface Definition, Version 1.1.2, June 2013, hereinafter the Qi standard. In the case of Qi standard compliant devices, Qi may define the process for power transfer to the power receiver. Specifically, the power transmitter may send a ping to detect the presence of an object, such as a power receiver, proximate to the power transmitter. The ping may be a beacon or a packet indicating that a response is required from the recipient. The ping may be a digital ping in accordance with the Qi standard. For example, the digital ping may comprise a power signal applied in order to detect and identify a power receiver. When a device is detected via the ping and a subsequent response from the power receiver, an identification and configuration phase takes place, during which the power receiver sends packets to the power transmitter. These packets may identify the power receiver and/or provide configuration and setup information to the power transmitter. Next, the power transfer phase begins. During power transfer, the power transmitter's primary coil may induce a power transfer to the power receiver's secondary coils (which is usually less than about 5 millimeters from the primary coil although greater distances may be realized as well). Moreover, the power receiver may send control/error packets requesting an increase or decrease in power from the power transmitter. When the power receiver sends an end power message to the power transmitter, the power transmitter may cease the power transfer. Although the Qi standard is described, this is merely an example of a wireless charging standard as other standards may be used as well.

The transmitter for wireless charging may be configured in accordance with a variety of different, incompatible wireless charging (WLC) protocols. These differences may make it challenging with respect to a configuration that provides a wireless charging surface area that can support different WLC protocols. To illustrate, a first standard may operate in the 6.78 MHz frequency range and using about as 3-6 rounds of wire, while a second standard may operate in the 100-00 kHz frequency range with about 20 rounds of wire in transmitter. In this example, a single, large WLC surface may be provided having different portions supporting different types of WLC protocols or different, separate WLC surfaces may be provided, each of which supporting different types of WLC protocols. However, a user may need to know where in the transmitter surface is (or at which surface), the device/receiver being charged should be placed. The user may not necessarily know this beforehand, and may not be even interested to know which systems or version he/she is using.

To illustrate further, a certain version of the Qi standard may have a WLC receiver that does not support multiple device charging on the receiver's charging surface but instead supports a single dedicated device, but other versions of Qi may support multiple receivers on the WLC charging surface. As such, a user may want to know whether charging allows multiple devices or a dedicated single area.

In some example embodiments, if a device is on a WLC charger surface area that is not compatible with supported WLC protocol of that transmitter/charger, the charger may provide an indication of which (if any) charger area is compatible with the device. For example, the indication may indicate whether the charging area is compatible with the WLC standard of the receiver and/or whether the device is placed in a compatible portion of the charging area (for example, in the case of a charging area having portions supporting different devices and/or WLC standards).

FIG. 1 depicts an example of an indication 199 presented on a user interface to indicate that a receiver 114 is placed in a portion of the WLC charging area 190 that is compatible with receiver 114. FIG. 2A on the other hand shows an example of an indication 299 presented on a user interface to indicate that receiver 114 is placed on a portion of the charging area 190 that is not compatible with the receiver 114. Moreover, an indication 295 may indicate a WLC compatible location where receiver 114 can be re-positioned on the charging surface 190. Although FIGS. 1 and 2 depict the indication as an indication on a user interface, any other type of indication (for example, a message, a visual indication, an audible indication, a haptic indication, and/or the like) may be used as well.

In some example embodiments, a wireless charger may monitor a WLC charging area in order to detect a potential receiver to be charged. To that end, the wireless charger (or transmitter) may send to a device (for example, a potential receiver) a signal, such as a ping signal according to a first wireless standard (and/or send a second signal, such as a second ping signal according to a second wireless standard and so forth). The WLC may also determine whether the device/potential receiver is compatible with the first wireless charging standard (and/or the second wireless charging standard if the second ping is sent). If the device/potential receiver is compatible, the potential receiver/device may respond in some manner (for example, the potential receiver may respond with a packet and enter an identification and configuration phase). Moreover, the receiver may respond with for example an indication 199 that the positioning is compatible as depicted at FIG. 1.

However, if the potential receiver/device is not compatible with the first WLC standard, the receiver may not respond with a desired response. If the transmitter does not detect a desired ping response, it may determine that the potential receiver/device is not compatible with the first WLC standard. Moreover, the potential receiver/device may response with a message, such as indicator 299, that the potential receiver/device's charging mode/standard is not supported by the wireless charging area or indicate another area, such as area 295. To illustrate further, a non-compatible receiver 114 may respond to a ping from a WLC transmitter with a certain load modulation (which may not be a valid response packet to the transmitter/WLC's ping packet), or the non-compatible receiver 114 may not respond at all. In this example, transmitter/WLC may detect incompatibility and thus indicate to device 114 (or an associated user) that another charging area 295 should be used for WLC.

In some example embodiments, a transmitter of the WLC may identify that a device/object has been located on the wireless charging area during for example an analog ping phase. For example, the WLC transmitter may detect a resonant shift by applying a short pulse to the transmitter's primary coil at a certain operating frequency and then measure any resulting primary coil current. The object, when placed on the wireless charging area where the WLC transmitter is located, may be detected based on a resonant frequency shift that causes a reduced primary cell current. Alternatively or additionally, the WLC transmitter may detect a capacitance change of the object or an electrostatic change when an object is close to the WLC transmitter charging surface.

If an object is found during the analog ping phase, the WLC transmitter may signal the WLC receiver, such as a device 114 being charged wirelessly. This signaling may be used to determine whether the WLC receiver is compatible with the wireless charging area where the receiver is located. For example, the signaling may comprise an identification phase protocol (for example, a digital ping phase) for a given portion of the charging surface area. Referring to FIG. 2A, the signaling provided at the portion 297 where receiver 114 is located may identify whether receiver 114 has a compatible WLC protocol. In the example of FIG. 2A, the portion 297 where receiver 114 is located does not have a compatible WLC protocol but the portion at 295 does have a WLC protocol that is compatible with receiver 114.

Referring to FIG. 2A, the WLC charging surface under receiver 114 may include one or more transmitters that can detect the WLC protocol standard at portion 295 or 297. In some example embodiments, the transmitter(s) at the WLC charging surface under receiver 114 may determine the WLC protocol standard being used by receiver 114 by detecting the magnetic signature of receiver 114 (for example, distinguishing between of the current consumption or load envelop of receiver 114).

Figure 2B:
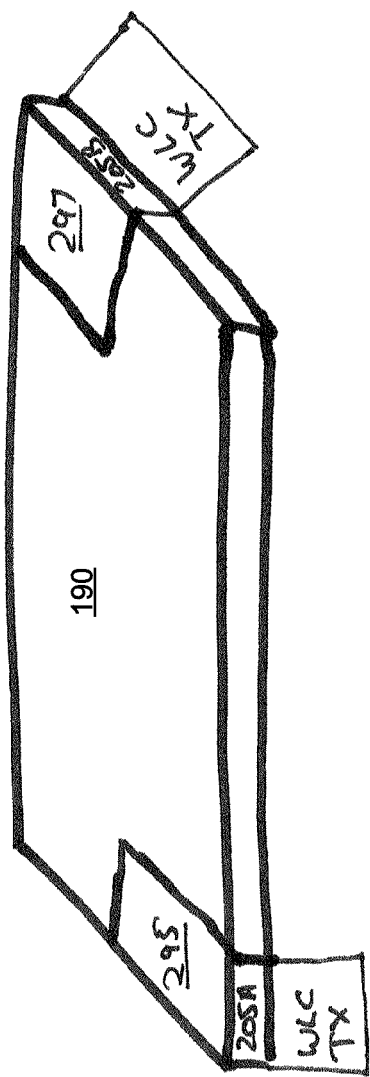
FIG. 2B depicts an example of a wireless charging surface, in accordance with some example embodiments.

FIG. 2B depicts the WLC charging surface 190 of FIG. 2A, in accordance with some example embodiments. When a user equipment including a WLC receiver 114 is placed on WLC surface 190, a WLC transmitter 205B may detect whether WLC receiver 114 is compatible. To illustrate further, WLC transmitter 205B may for example apply a power signal at a specified frequency (which may depend on a given WLC protocol). If the WLC receiver 114 does not respond by modulating the power signal within a certain time period, the WLC transmitter 205B may determine that the receiver or object at the wireless charging area 190 is not compatible with that WLC standard. If the WLC receiver responds using a certain modulation or a packet not recognized by the WLC transmitter, this may indicate an incompatibility, such as operating frequencies of two standards that are relatively close to each other. A receiver may also respond by a packet indicating a preferred power transfer mode/parameters.

If the potential WLC receiver 114 (or object) on a certain portion of the WLC charging surface 190 is not compatible with the WLC standard supported by the WLC transmitter 205B at area 297 of the WLC charger, the WLC identification protocol may fail. After the failure is detected, another wireless charging area 295 may indicate where another possibly compatible WLC transmitter 205A is located.

In some example embodiments, WLC transmitter 205B includes circuitry to detect a plurality of WLC protocol standards. For example, WLC transmitter 205B may operate at one or more different frequencies, one or more different inductances, and/or one or more different signaling protocols between the transmitter and receiver in order to detect the WLC protocol of the WLC receiver 114. Moreover, WLC transmitter 205B may include information regarding whether other WLC are supported, such as WLC transmitter 205 and area 295 and the like.

If a WLC charging area is not able to recognize a given WLC receiver (for example, because the WLC receiver is of another type of WLC standard), the WLC transmitter may not able to differentiate between a non-compatible receiver and a foreign object. When this is the case, WLC transmitter may indicate 295 another WLC charging area regardless of whether the detected object is a non-compatible receiver or a generic object. To avoid problems with foreign objects, the transmitter may keep track of the objects detected by different charging areas. For example, if a first WLC transmitter area detects a non-compatible object (for example, a receiver of a third standard), the first WLC transmitter may indicate another WLC charging area. But if the second charging area detects a non-compatible object within a time period from the first detection, it would not indicate the first area again. Also, if an object detected by the first area is not moved during a time period, the transmitter may stop indicating the second charging area.

In some example embodiments, the charging surface may be configured detect a plurality of different types of WLC standards. When a device is placed on the charging surface that is not compatible with the device, a compatible area is indicated (see for example indication 295 at FIG. 2A) to a receiver, such as a user equipment and/or any other device.

In some example embodiments, the WLC transmitter may consider a standard or a version of a standard when indicating a charging area preferred for placing a WLC receiver. A WLC transmitter may include for example a first charging area that supports only one specific standard or standard version and a second charging area that supports multiple standards or standard versions. A WLC receiver supporting a particular standard or a standard version may be known to support also another standard or a standard version. For example, a WLC receiver supporting Wireless Power Consortium's Qi specification version 1.1 may be mandated to be compatible with Qi version 1.0 as well. A WLC transmitter may optimize the placement of a WLC receiver such that the WLC transmitter is able to support as many WLC receivers as possible. For example, if the WLC transmitter detects that a WLC receiver placed on the first charging area is compatible also with the second charging area, the WLC transmitter may indicate the second charging area to the user. If the user moves the WLC receiver to the second charging area, the first charging area, which supports multiple standards or standard types, is free for another WLC receiver and the likelihood of being able to support the another receiver is increased. This non-mandatory re-placement of the WLC receiver may be indicated with a different user indication, for example a different color or sound.

In some example embodiments, the user may be indicated to switch locations of WLC receivers. For example, if a first WLC receiver occupies the first charging area and an incompatible WLC receiver is placed on the second charging area. The WLC transmitter may determine whether the incompatible receiver would be compatible with one of the standards or standard types supported by the first charging area. If yes, the WLC transmitter may advise the user to switch the locations of the WLC receivers.

The WLC transmitter may receive information about the standard or standard version supported by the WLC receiver for example in a ping response message or a message during the identification and configuration phase.

Indication of the preferred charging area may be based on the color of a WLC receiver. This is beneficial for example, when another WLC receiver is placed on the WLC transmitter. WLC transmitter may receive information about a color of a WLC receiver for example in a ping response message or a message during the identification and configuration phase. If a first WLC receiver (currently placed on the first charging area) has a blue color, the WLC transmitter may indicate the preferred location for the first WLC with a blue color.

In some example embodiments, the WLC transmitter may send and/or receive identification information to/from a WLC receiver. The identification information sent to the WLC receiver may include information, for example an identification code, name, or an identification color, which the WLC transmitter uses to distinguish the WLC receiver from other WLC receivers. If it is desirable to advise the user to re-locate a WLC receiver, the WLC transmitter may indicate the preferred charging area by changing the color of the preferred charging are according to the identification color, or, otherwise associate the identification information to the preferred charging area. The WLC receiver may receive the identification information that the WLC transmitter uses for it and may indicate this to the user. For example, if the transmitter uses a blue color to identify a WLC receiver, the WLC receiver may receive information about this identification color and adjust its appearance accordingly, for example by displaying a blue color on the screen.

Figure 3:
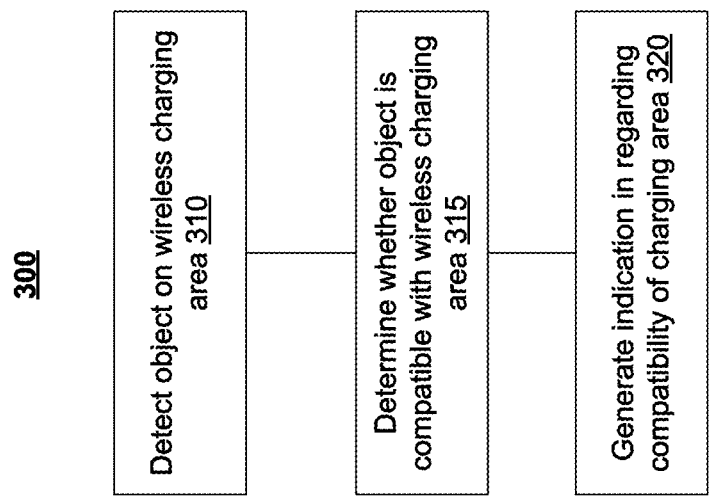
FIG. 3 depicts an example process for indicating wireless charging compatibility, in accordance with some example embodiments.

FIG. 3 depicts an example process 300 for generating an indication regarding WLC charging compatibility, in accordance with some example embodiments.

At 310, an object may be detected on a WLC charging surface area, in accordance with some example embodiments. For example, a device, such as a user equipment including a WLC receiver 114, may be placed on a wireless charging surface 190 as shown at 297 (FIGS. 2A and 2B). The WLC transmitter 205B may detect whether an object is present by for example detecting a resonant change, an electrostatic change, and/or the like.

At 315, the WLC transmitter may determine whether the detected object is compatible with the WLC charging surface area or with another WLC charging surface area operating using another WLC standard, in accordance with some example embodiments. For example, WLC transmitter 205B may take an action, such as a digital ping, and determine whether the WLC receiver 114 responds. If the receiver responds in accordance with a WLC protocol standard supported by WLC receiver 114, then WLC transmitter 205B and WLC receiver 114 are compatible for charging. However, if the receiver responds in a way that is not in accordance with a WLC protocol standard supported by WLC transmitter 205B (or fails to respond at all), and then WLC transmitter 205B and WLC receiver 114 are not compatible for charging. In some example embodiments, the WLC transmitter 205B may be able to detect a variety of WLC protocols, which may be used by WLC receiver 114 in order to direct the WLC receiver 114 to a compatible charging surface and WLC transmitter.

At 320, an indication may be generated regarding the compatibility of the WLC charging area, in accordance with some example embodiments. For example, if the WLC receiver 114 and the WLC transmitter 205B have compatible WLC charging protocols, WLC transmitter 205B may cause a compatibility indication, such as message 199, to be provided to a user equipment including WLC receiver 114. On the other hand, if the WLC receiver 114 and the WLC transmitter 205B do not have compatible WLC charging protocols, WLC transmitter 205B may cause an incompatibility indication, such as message 299, to be provided to a user equipment including WLC receiver 114. Moreover, WLC transmitter 205B may provide information regarding a compatible WLC charging location 295 to allow user equipment including WLC receiver 114 to find a charging area.

Figure 4A:
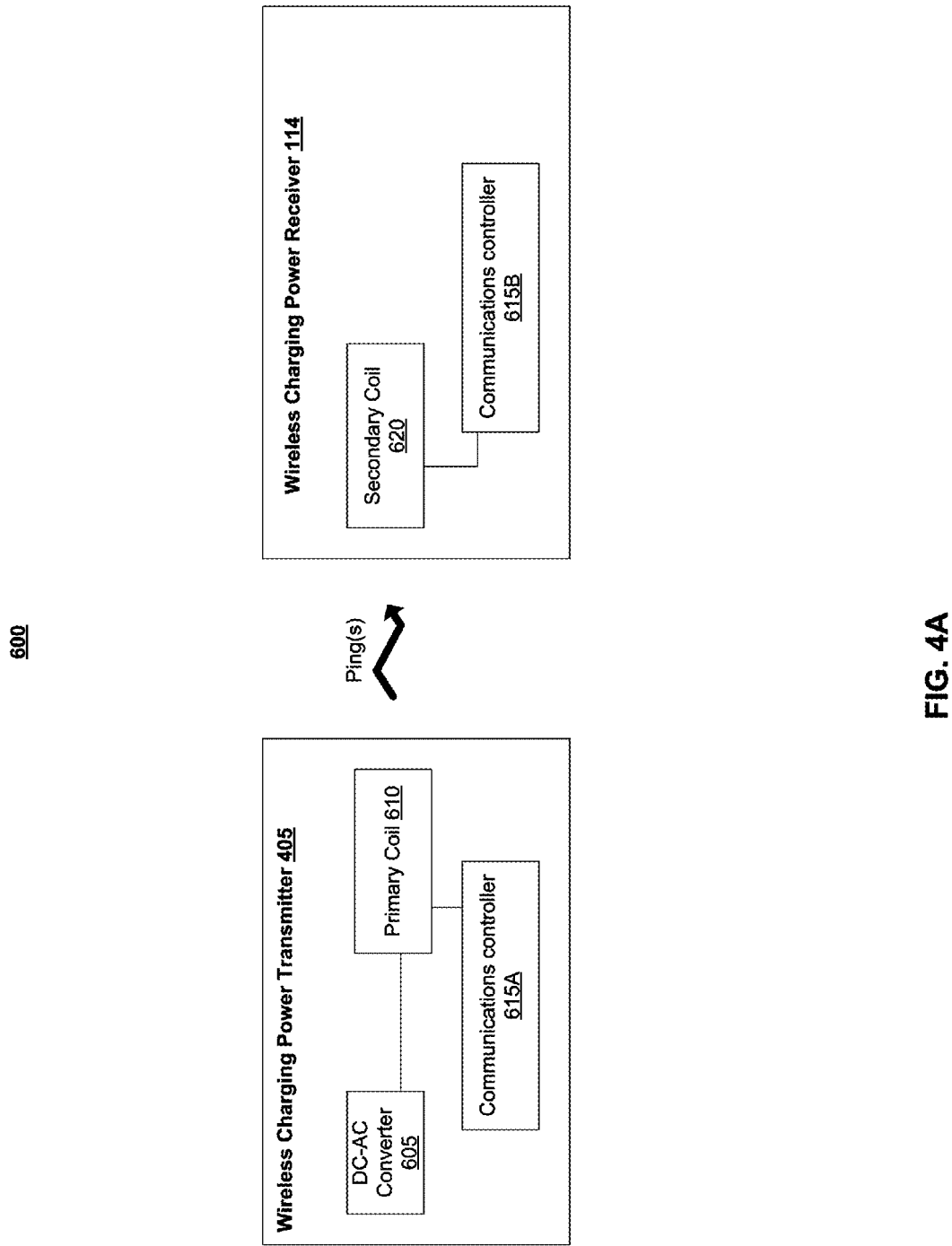
FIG. 4A depicts an example of wireless charging transmitter and an example of a wireless charging receiver, in accordance with some example embodiments.

FIG. 4A depicts a system 600 including a wireless power transmitter 405 and a wireless power receiver 114, in accordance with some example embodiments. The WLC transmitter 405 may have an associated area (or charging surface) and may operate according to one or more standards. Moreover, as noted above, transmitter 405 may include circuitry to detect different types (or variable) of WLC standards at a receiver 114, in accordance with some example embodiments. As such, when the power receiver is not compatible with the power transmitter, an indication, such as indication 299 regarding the incompatibility may be generated and/or an indication 295 of another charging area that is compatible with the charging surface may be generated as well.

Referring to FIG. 4A, power transmitter 405 may include a DC-AC converter 605 to provide power to a primary coil 610. This coil may induce power, during a charging phase, into secondary coil 620 of the power receiver 114. The power transmitter 405 may also include a communications controller 615A for controlling the operation of transmitter 405. Communication controller 615A may also provide the ping messages to be carried from the primary coil 610 to the secondary coil 620 and detect messages and the like sent from the secondary coil 620 to primary coil 610. Moreover, communications controller 615A may detect whether the receiver 114 is compatible and generate indications (for example 199, 295, and 299). Power receiver 114 may also include a communication controller 615B. Communication controller 615B may also receive the ping messages carried from the primary coil 610 to the secondary coil 620 and/or control responses to the pings.

Figure 4B:
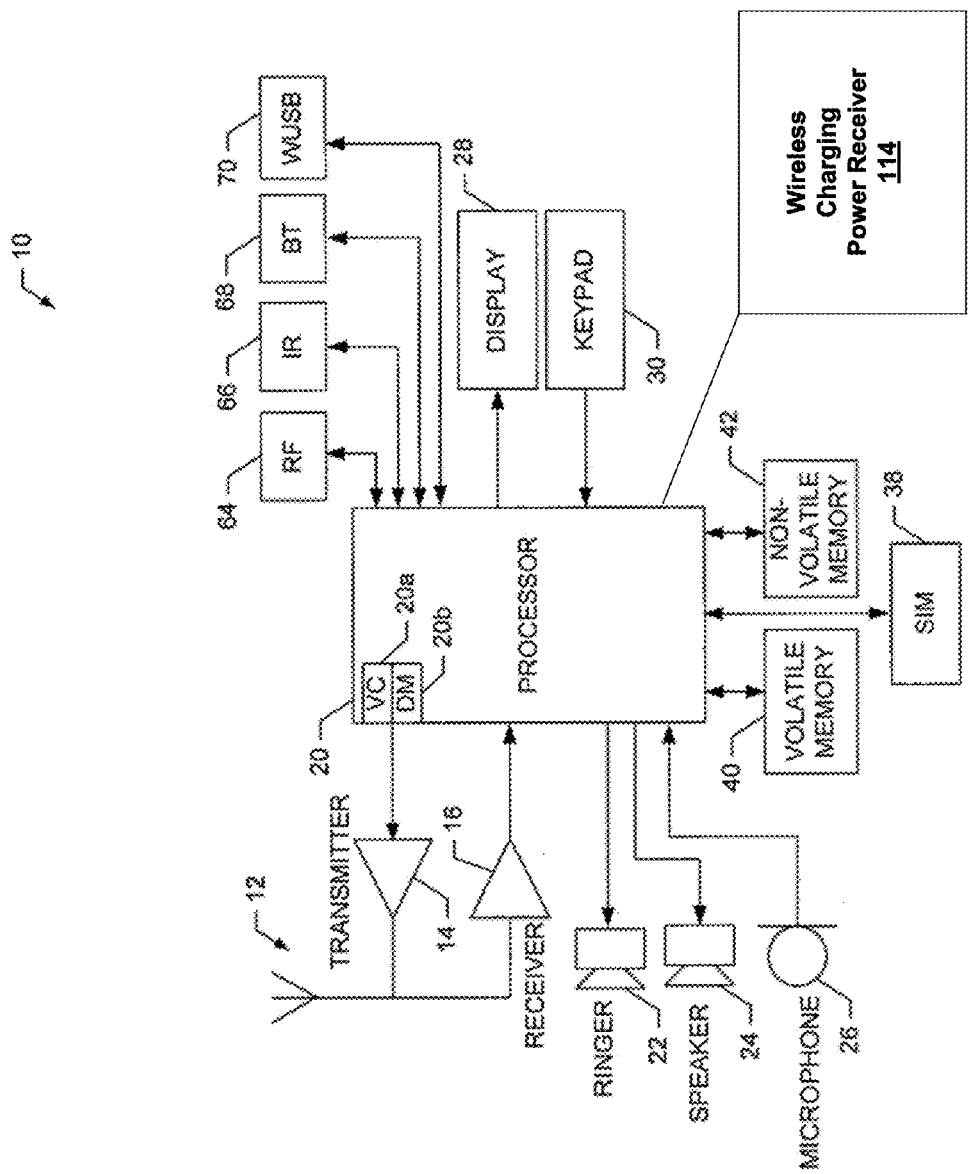
FIG. 4B depicts an example of a user equipment, in accordance with some example embodiments.

FIG. 4B illustrates a block diagram of an apparatus 10, in accordance with some example embodiments. Apparatus 10 may include a WLC receiver and/or a WLC transmitter. Moreover, apparatus 10 may be implemented as a user equipment, such as a smart phone, a source of audio (for example, a microphone and the like), a sink of audio (for example, a speaker), a microphone, a headset, a digital headset, a television, a tablet, and/or any other device.

The apparatus 10 may, in some example embodiments, include at least one antenna 12 in communication with a transmitter 14 and a receiver 16. Alternatively transmit and receive antennas may be separate.

The apparatus 10 may, in some example embodiments, also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4B as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4B, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to perform one or more of the operations disclosed herein with respect to the host, accessory device, and/or extension device. The memories may comprise an identifier, such as an international mobile equipment identification (IMEI) code, capable of uniquely identifying apparatus 10. The functions may include one or more of the operations disclosed with respect to host, accessory device, and/or extension device including one or more aspects of process 300. The memories may comprise an identifier, such as an international mobile equipment identification (IMEI) code, capable of uniquely identifying apparatus 10. In the example embodiment, the processor 20 may be configured using computer code stored at memory 40 and/or 42 to perform one or more of the operations disclosed herein including process 300.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4B, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is detection of incompatible WLC transmitter/receiver pairs.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments may comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   detecting a presence of an object at least proximate to a first wireless power transmitter;
   determining whether the object is compatible with a first wireless power protocol of the first wireless power transmitter; and
   providing an indication representative of a location of a second wireless power transmitter, when the determining indicates the object is incompatible with the first wireless power protocol of the first wireless power transmitter.

2. The method of claim 1, wherein the determining whether the object is compatible with the first wireless power protocol comprises:
   sending a ping signal according to the first wireless power protocol; and
   determining whether a response is received in a predetermined time.

3. The method of claim 2, wherein the response is a ping response.

4. The method of claim 2, further comprising:
   sending a ping signal according to a second wireless power protocol of the second wireless power transmitter; and
   determining whether a second ping response is received in a predetermined time.

5. The method of claim 2, wherein the determining whether the object is compatible with the first wireless power protocol comprises:
   detecting a load modulation of the ping signal;
   decoding the load modulation of the ping signal to obtain a ping response; and
   determining that the ping response is not compatible with the first wireless power protocol.

6. The method of claim 5, further comprising:
   determining that the ping response is compatible with a second wireless power protocol of the second wireless power transmitter.

7. The method of claim 1, wherein the first wireless power transmitter supports a plurality of wireless power protocols or protocol versions, and wherein the method further comprises:
   providing the indication representative of the location of the second wireless power transmitter, in response to determining that the object is compatible with the first wireless power transmitter and the second wireless power transmitter.

8. An apparatus comprising:
   a detector to detect a presence of an object at least proximate to a first wireless power transmitter; and
   at least one processor at least one processor and at least one memory including computer program code, the at least one memory and the computer program code configured to, with the at least one processor, cause the apparatus determine whether the object is compatible with a first wireless power protocol of the first wireless power transmitter and provide an indication representative of a location of a second wireless power transmitter, when the determining indicates the object is incompatible with the first wireless power protocol of the first wireless power transmitter.

9. The apparatus of claim 8, wherein the apparatus is further configured to at least send a ping signal according to the first wireless power protocol and determine whether a response is received in a predetermined time.

10. The apparatus of claim 9, wherein the response is a ping response.

11. The apparatus of claim 9, wherein the apparatus is further configured to at least send a ping signal according to a second wireless power protocol of the second wireless power transmitter and determine whether a second ping response is received in a predetermined time.

12. The apparatus of claim 9, wherein the apparatus is further configured to at least detect a load modulation of the ping signal, decode the load modulation of the ping signal to obtain a ping response, and determine that the ping response is not compatible with the first wireless power protocol.

13. The apparatus of claim 12, wherein the apparatus is further configured to at least determine that the ping response is compatible with a second wireless power protocol of the second wireless power transmitter.

14. The apparatus of claim 8, wherein the first wireless power transmitter supports a plurality of wireless power protocols or protocol versions, and wherein the apparatus is further configured to at least provide the indication representative of the location of the second wireless power transmitter, in response to determining that the object is compatible with the first wireless power transmitter and the second wireless power transmitter.

15. A non-transitory computer readable storage medium including computer program code which when executed by at least one processor causes operations comprising:
   detecting a presence of an object at least proximate to a first wireless power transmitter;
   determining whether the object is compatible with a first wireless power protocol of the first wireless power transmitter; and
   providing an indication representative of a location of a second wireless power transmitter, when the determining indicates the object is incompatible with the first wireless power protocol of the first wireless power transmitter.

* * * * *